(12) United States Patent
Voigt et al.

(10) Patent No.: US 7,283,246 B2
(45) Date of Patent: Oct. 16, 2007

(54) METHOD FOR REGULATING THE OPERATING FREQUENCY AND MULTIFUNCTIONAL INTEGRATED CIRCUIT CHIP FOR A FIBER-OPTIC GYROSCOPE

(75) Inventors: Sven Voigt, Freiburg (DE); Guenter Spahlinger, Stuttgart (DE)

(73) Assignee: Litef GmbH, Freiburg (DE)

( * ) Notice: Subject to any disclaimer, the term of this patent is extended or adjusted under 35 U.S.C. 154(b) by 162 days.

(21) Appl. No.: 10/529,707

(22) PCT Filed: Sep. 17, 2003

(86) PCT No.: PCT/EP03/10328

§ 371 (c)(1),
(2), (4) Date: Mar. 29, 2005

(87) PCT Pub. No.: WO2004/038329

PCT Pub. Date: May 6, 2004

(65) Prior Publication Data

US 2006/0164651 A1 Jul. 27, 2006

(30) Foreign Application Priority Data

Sep. 30, 2002 (DE) .............................. 102 45 540

(51) Int. Cl.
*G01C 19/72* (2006.01)

(52) U.S. Cl. ........................ 356/464; 356/460; 356/462

(58) Field of Classification Search ................ 356/460, 356/462, 464
See application file for complete search history.

(56) References Cited

U.S. PATENT DOCUMENTS

| 5,018,859 | A | * | 5/1991 | Chang et al. ................ 356/464 |
| 5,157,461 | A | * | 10/1992 | Page ........................... 356/462 |
| 5,465,149 | A | | 11/1995 | Strandjord et al. |
| 5,469,257 | A | | 11/1995 | Blake et al. |
| 5,926,275 | A | | 7/1999 | Sanders et al. |
| 6,014,217 | A | | 1/2000 | Sanders et al. |
| 6,760,111 | B1 | | 7/2004 | Mark et al. |
| 7,190,463 | B2 | * | 3/2007 | Spahlinger ................... 356/464 |

FOREIGN PATENT DOCUMENTS

| DE | 19629260 | 2/1998 |
| DE | 19753427 | 2/1999 |
| DE | 10130159 | 1/2003 |

* cited by examiner

*Primary Examiner*—Gregory J. Toatley, Jr.
*Assistant Examiner*—Iyabo S Alli
(74) *Attorney, Agent, or Firm*—Elliott N. Kramsky

(57) ABSTRACT

A method for regulating the operating frequency of a closed loop fiber optic gyroscope. The demodulated output signal of a detector, as actual signal, is applied to the input of a main controller and, via a gating filter, to a VCO that determines the system clock of the FOG. An additional modulation signal, as analog signal is fed to separate phase correction electrodes that are formed together with the electrodes of a digital phase modulator in an integrated optical chip.

3 Claims, 2 Drawing Sheets

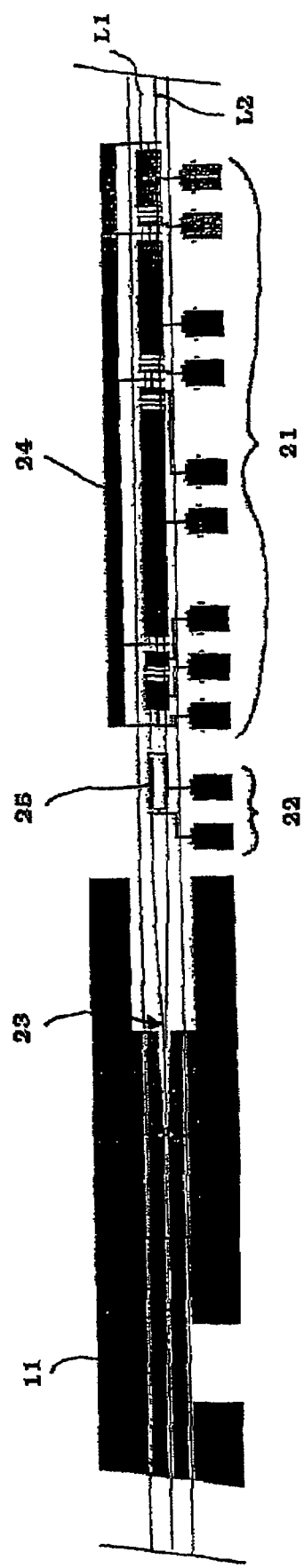

METHOD FOR REGULATING THE OPERATING FREQUENCY AND MULTIFUNCTIONAL INTEGRATED CIRCUIT CHIP FOR A FIBER-OPTIC GYROSCOPE

BACKGROUND

1. Field of the Invention

The present invention relates to fiber optic gyroscopes (FOGs). More particularly, this invention pertains to a method and apparatus for regulating the operating frequency of a closed loop FOG.

2. Description of the Prior Art

German patent DE 197 53 427 C1 describes a digital phase modulator for closed loop fiber optic rate-of-rotation sensors in which the less significant portion of a binary drive signal supplied by an FOG main controller is converted into an analog signal by means of a relatively low resolution digital/analog converter to increase resolution. The analog signal is fed to a dedicated electrode on the integrated optical chip containing the digital phase modulator. Resolution can thus be increased e.g. from 8 to approximately 10 bits. The separate dedicated electrode (or, if appropriate, a separate electrode pair) is assigned directly to the digital phase modulator.

German patent application 101 30 159.6 discloses a method for avoiding bias errors due to synchronous interference in closed loop fiber-optic gyroscopes by superposing a signal on the demodulated output signal of the FOG detector. Such signal is periodic at the sampling clock rate of the FOG and is applied in the form of a modulation that is added at the digital phase modulator of a multifunctional integrated optical chip. The residue of the added modulation present in the demodulated detector signal is detected and fed to an auxiliary control loop that readjusts the operating frequency so that the added modulation tends toward zero as much as possible.

Implementation of the above method (through the use of a mixed drive signal at the phase modulator of the MIOC), which considerably increases the accuracy of FOGs, has led, in practice to difficulties. Such difficulties relate, in particular, to a conflict of objectives when it is simultaneously attempted to solve digital phase modulator resolution without increasing the structural length of the MIOC other than is described in the abovementioned German patent specification. This is particularly true when the phase modulator is intended to be operated with non-binary drive signals to increase resolution.

SUMMARY AND OBJECTS OF THE INVENTION

It is therefore an object of the invention to simplify the regulation of FOG operating frequency.

In a first aspect, the invention provides a method for regulating the operating frequency of a fiber optic gyroscope with a closed control loop. The demodulated output signal of the FOG detector, as actual signal, is applied on the one hand to the input of a FOG main controller and, on the other hand, via a gating filter to a VCO that determines the system clock of the FOG. The output signal of the main controller, as modulation signal, is fed to a digital phase modulator formed in a multifunctional integrated optical chip and, for determining and regulating the exact operating frequency of the FOG, a periodic additional modulation signal is superposed on the demodulated detector output signal passing to the gating filter.

Such method is characterized in that the additional modulation signal, as analog signal, is fed to separate phase correction electrodes in the multifunctional integrated optical chip.

In a second aspect, the invention provides a multifunctional integrated optical chip for a fiber optic gyroscope in which a phase modulator realized by electrodes arranged parallel to a light guiding path is implemented as at least one functional group.

Such multifunctional integrated optical chip is characterized in that, in addition to the phase modulator, an electrode pair arranged parallel to the light guiding path is present for applying a periodic additional modulation signal to a light beam on the light guiding path for the purpose of regulating the operation frequency of the gyroscope.

The preceding and other features of the invention will be apparent from the detailed description that follows. Such description is accompanied by a set of drawing figures. Numerals of the drawings, corresponding to those of the written description, point to the features of the invention with like numerals referring to like features throughout.

BRIEF DESCRIPTION OF THE DRAWINGS

FIG. 2 is a simplified plan view of a multifunctional integrated optical chip (MIOC) for realizing the frequency regulating method of the invention.

DETAILED DESCRIPTION OF THE PREFERRED EMBODIMENT

Figure 1:
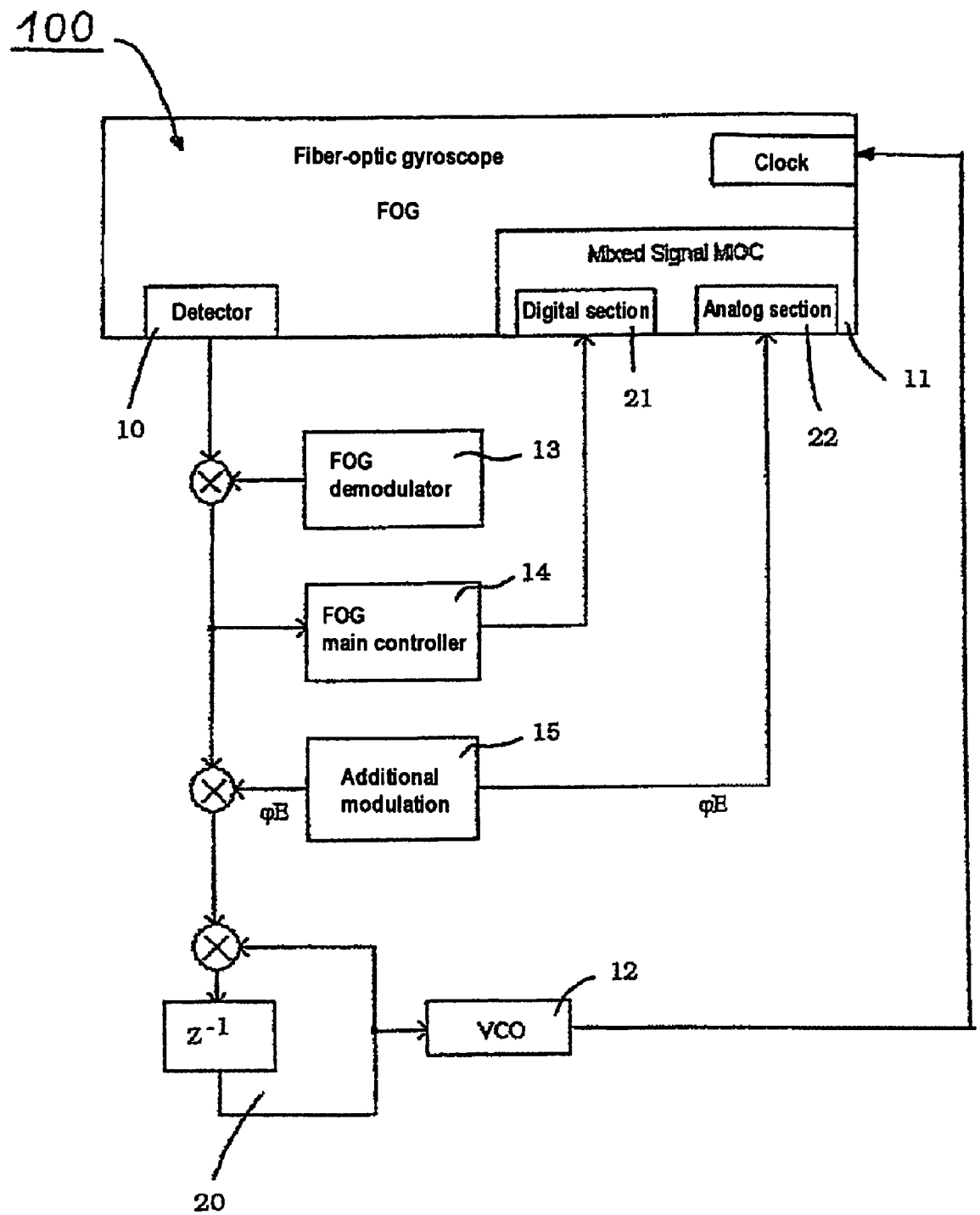
FIG. 1 is a schematic block diagram of the architecture of a FOG with operating frequency regulation in accordance with the invention.

FIG. 1 is a schematic block diagram of the architecture of a FOG 100 with operating frequency regulation in accordance with the invention. A measurement signal supplied by the detector 10 of the FOG 100 contains rate-of-rotation information. Such signal is demodulated by a FOG demodulator 13 and, as a fiber optic gyroscope with a closed control loop is involved, it is applied to the input of a FOG main controller 14.

FIG. 2 is a simplified plan view of a multifunctional integrated optical chip (MIOC) 11 for realizing the frequency regulating method of the invention. Referring to both FIGS. 1 and 2, the FOG main controller 14, inter alia, supplies a preferably non-binary $U_\pi$, or resetting signal, at its output side to a digital phase modulator 24 that is formed in the MIOC 11. In mirror-image, in a manner known in theory, this influences the light beams on two light guiding paths L1, L2, produced after a beam splitting at 23 and passing through a measuring coil (not shown) in opposite directions.

In addition to the FOG demodulator 13 and the FOG main controller 14, an additional modulation device 15 is provided, the periodic output signal $\phi E$ of which is superposed on the modulation signal from the FOG main controller and controls, via a gating filter 20, a voltage-controllable oscillator (VCO) 12 that provides the operating clock of the FOG gyroscope system.

According to the invention, the additional modulation signal $\phi E$ passes to an analog section formed in the MIOC 11 and, as best illustrated in FIG. 2, is realized by an additional electrode pair 25 that is separate from the digital phase modulator 24. The additional modulator signal $\phi E$ has relatively small amplitude and is periodic at the sampling clock rate. It is thus passed to the additional electrode, or the electrode pair 25 in the example illustrated in FIG. 2, and typically, but not exclusively, produces a maximum phase shift of $\pi/32$. This phase shift is sufficient to generate, after demodulation, a signal that controls the VCO 12 via the gating filter 20 in such a way that the desired operating frequency of the FOG system is precisely accomplished. In contrast to the solution described in German patent application 101 30 159.6 the periodic additional modulation signal φE for determining gyroscope frequency, is not added to the digital MIOC modulation signal. Rather, it is passed directly to the additional analog electrode or the electrode pair 25 (i.e., to the analog section 22 of the MIOC 11.)

A particular advantage of the invention is that the additional modulation signal φE needn't be digitally converted, obviating the addition of a modulation signal and additional modulation. Rather, a periodic additional signal for determining the frequency or regulating the frequency of the FOG, as analog signal, is fed to separated phase correction electrodes formed in the MIOC.

In the case of a method of the generic type mentioned in the background, simplification of regulation of the operating frequency of a FOG is achieved according to the invention by virtue of the fact that a periodic additional signal for determining the frequency or regulating the frequency of the FOG, as analog signal, is fed to separate phase correction electrodes formed in the MIOC.

The MIOC for a FOG in which a phase modulator is realized by electrodes arranged parallel to a light guiding path is implemented as at least one functional group. It is suitable for realizing the method of the invention as, according to the invention, in addition to the phase modulator, an electrode pair arranged parallel to the light guiding path is present for applying a periodic additional modulation signal to a light beam on the light guiding path to regulate the operation frequency of the gyroscope.

An optimized structural size of the integrated optical chip can be achieved when the additional electrode pair is arranged between the digital phase modulator and a beam splitter within the chip.

While the invention has been described with reference to its presently preferred embodiment, it is not limited thereto. Rather, the invention is limited only insofar as it is defined by the following set of patent claims and includes within its scope all equivalents thereof.

What is claimed is:

1. A method for regulating the operating frequency of a fiber optic gyroscope with a closed control loop, in which the demodulated output signal of the FOG detector, as actual signal, is applied on the one hand to the input of an FOG main controller and on the other hand, via a gating filter, to a VCO that determines the system clock of the FOG, the output signal of the main controller, as modulation signal, being fed to a digital phase modulator formed in a multifunctional integrated optical chip, and, for the purpose of determining and regulating the exact operating frequency of the FOG, a periodic additional modulation signal is superposed on the demodulated detector output signal passing to the gating filter, characterized in that the additional modulation signal, as analog signal, is fed to separate phase correction electrodes formed in the multifunctional integrated optical chip.

2. A multifunctional integrated optical chip for a fiber optic gyroscope in which a digital phase modulator realized by electrodes arranged parallel to a light guiding path is implemented as at least one functional group, characterized in that, in addition to the digital phase modulator, an electrode pair arranged parallel to the light guiding path is present for applying a periodic additional modulation signal to a light beam on the light guiding path for the purpose of regulating the operation frequency of the gyroscope.

3. The integrated optical chip as claimed in claim 2, characterized in that the additional electrode pair is arranged between the phase modulator and a beam splitter.

* * * * *